(12) United States Patent
Liu et al.

(10) Patent No.: US 7,493,312 B2
(45) Date of Patent: Feb. 17, 2009

(54) MEDIA AGENT

(75) Inventors: Wen-Yin Liu, Beijing (CN); Hong-Jiang Zhang, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 10/853,375

(22) Filed: May 24, 2004

(65) Prior Publication Data

US 2004/0220925 A1 Nov. 4, 2004

Related U.S. Application Data

(62) Division of application No. 09/998,092, filed on Nov. 30, 2001.

(51) Int. Cl.
*G06F 17/30* (2006.01)
(52) U.S. Cl. .................. 707/3; 707/5; 707/6; 707/10
(58) Field of Classification Search .................. 707/3–5, 707/7, 10
See application file for complete search history.

(56) References Cited

U.S. PATENT DOCUMENTS

| | | | |
|---|---|---|---|
| 5,442,778 A | 8/1995 | Pedersen et al. | |
| 5,619,709 A | 4/1997 | Caid et al. | |
| 5,682,539 A | 10/1997 | Conrad et al. | |
| 5,734,886 A | 3/1998 | Grosse et al. | |
| 5,751,286 A | 5/1998 | Barber et al. | |
| 5,802,361 A | 9/1998 | Wang et al. | |
| 5,809,498 A | 9/1998 | Lopresti et al. | |
| 5,819,273 A | 10/1998 | Vora et al. | |
| 5,855,015 A | 12/1998 | Shoham | |
| 5,873,056 A | 2/1999 | Liddy et al. | |
| 5,873,076 A | 2/1999 | Barr et al. | |
| 5,889,506 A | 3/1999 | Lopresti et al. | |
| 5,893,095 A | 4/1999 | Jain et al. | |
| 5,899,999 A | 5/1999 | De Bonet | |
| 5,963,940 A * | 10/1999 | Liddy et al. ................ 707/5 |
| 5,974,409 A * | 10/1999 | Sanu et al. ................. 707/3 |
| 5,983,237 A | 11/1999 | Jain et al. | |
| 5,987,457 A | 11/1999 | Ballard | |
| 5,999,942 A * | 12/1999 | Talati ................. 707/104.1 |
| 6,020,955 A | 2/2000 | Messina | |
| 6,038,560 A | 3/2000 | Wical | |
| 6,094,652 A | 7/2000 | Faisal | |
| 6,134,532 A | 10/2000 | Lazarus et al. | |
| 6,169,986 B1 * | 1/2001 | Bowman et al. .......... 707/5 |
| 6,175,829 B1 | 1/2001 | Li et al. | |

(Continued)

OTHER PUBLICATIONS

Zhang et al.; "A Scheme of Visual Feature Based Image Indexing" To appear in SPIE Conference on Storage and Retrieval for Image and Video Databases, San Jose CA, Feb. 1995, pp. 1-12.

(Continued)

*Primary Examiner*—Cam Y Truong
(74) *Attorney, Agent, or Firm*—Lee & Hayes, PLLC

(57) ABSTRACT

Systems and methods for a media agent are described. In one aspect, user access of a media content source is detected. Responsive to this detection, a piece of media content and associated text is collected from the media content source. Semantic text features are extracted from the associated text and the piece of media content. The semantic text features are indexed into a media database.

7 Claims, 8 Drawing Sheets

U.S. PATENT DOCUMENTS

| | | | |
|---|---|---|---|
| 6,189,002 | B1 | 2/2001 | Roitblat |
| 6,282,549 | B1 | 8/2001 | Hoffert et al. |
| 6,304,864 | B1 | 10/2001 | Liddy et al. |
| 6,311,194 | B1 | 10/2001 | Sheth et al. |
| 6,345,274 | B1 | 2/2002 | Zhu et al. |
| 6,347,313 | B1 | 2/2002 | Ma et al. |
| 6,366,908 | B1 | 4/2002 | Chong et al. |
| 6,382,218 | B1 | 5/2002 | Cheng |
| 6,404,925 | B1 | 6/2002 | Foote et al. |
| 6,480,843 | B2 * | 11/2002 | Li .................................. 707/5 |
| 6,510,406 | B1 | 1/2003 | Marchisio |
| 6,516,350 | B1 | 2/2003 | Lumelsky et al. |
| 6,523,026 | B1 | 2/2003 | Gillis ............................ 707/3 |
| 6,553,385 | B2 | 4/2003 | Johnson et al. |
| 6,564,202 | B1 | 5/2003 | Schuetze et al. |
| 6,567,797 | B1 | 5/2003 | Schuetze et al. |
| 6,675,159 | B1 | 1/2004 | Lin et al. ....................... 707/3 |
| 6,687,696 | B2 | 2/2004 | Hofmann et al. |
| 6,728,706 | B2 | 4/2004 | Aggarwal et al. |
| 6,760,714 | B1 | 7/2004 | Caid et al. .................... 706/14 |
| 6,766,316 | B2 | 7/2004 | Caudill et al. .................. 707/3 |
| 6,766,320 | B1 | 7/2004 | Wang et al. .................... 707/5 |
| 6,791,579 | B2 | 9/2004 | Markel |
| 6,832,218 | B1 | 12/2004 | Emens et al. |
| 6,859,802 | B1 | 2/2005 | Rui |
| 6,877,001 | B2 | 4/2005 | Wolf et al. |
| 6,895,552 | B1 | 5/2005 | Balabanovic et al. |
| 7,000,141 | B1 | 2/2006 | Karlsson et al. |
| 7,089,237 | B2 | 8/2006 | Turnbull et al. |
| 7,089,309 | B2 | 8/2006 | Ramaley et al. |
| 7,099,869 | B1 | 8/2006 | Forstall et al. |
| 2002/0038299 | A1 | 3/2002 | Zernik et al. |
| 2002/0052933 | A1 | 5/2002 | Leonhard et al. |
| 2002/0073088 | A1 * | 6/2002 | Beckmann et al. ............ 707/10 |
| 2002/0099812 | A1 * | 7/2002 | Davis et al. ................. 709/224 |
| 2002/0194178 | A1 * | 12/2002 | Gilmour et al. ................ 707/9 |
| 2002/0194200 | A1 | 12/2002 | Flank et al. |
| 2003/0028512 | A1 | 2/2003 | Stensmo |
| 2003/0050916 | A1 * | 3/2003 | Ortega et al. ................... 707/1 |
| 2003/0229537 | A1 * | 12/2003 | Dunning et al. .............. 705/10 |
| 2004/0111408 | A1 | 6/2004 | Caudill et al. .................. 707/3 |

OTHER PUBLICATIONS

Kosugi; "Practical Query-By Humming System" Proc of the 8th ACM International Conference on Multimedia, 2000, pp. 333-342.

Mitchell; "Machine Learning" McGraw-Hill, 1997, pp. 176-183.

Lu et al.; "A Unified Framework for Semantics and Feature Based Relevance Feedback in Image Retrieval Systems" In: Proc. of the 8th ACM International Conference on Multimedia, 2000, pp. 31-38.

Kim et al.; "A Rule-Based Named Entity Recognition System for Speech Input" In: Proc. of the Sixth International Conference on Spoken Language Processing, 2000, vol. 1 pp. 528-531.

Joachims; "A Probabilistic Analysis of the Rocchio Algorithm with TFIDF for Text Categorization" In Proc. of the Fourteenth International Conference on Machine Learning, Nashville TN, Jul. 1997, pp. 143-151. Morgan kaufmann Publisher San Francisco CA.

Horvitz et al.; "The Lumiere Project: Beysian User Modeling for Inferring the Goals and Needs of Software Users" In: Proc. of the 14th Conference on Uncertainty in Artificial Intelligence, 1998.

Harman et al.; "Inverted Files" In: Information Retrieval:Data Structures and Algorithms Frankes WB and Baeza-Yates R (eds) 1992 Chapter 3 Prentice Hall NY.

Flickner et al.; "Query by Image and Video Content: The QBIC System" IEEE Computer, Sep. 1995, pp. 23-32.

Rikel et al.; "Nymble: A High-Performance Learning Name-Finder" Proc. of the Fifth Conference on Applied Natural Language Processing Associate for Computational Linguistics, 1997, pp. 194-201.

Allen; "Natural Language Understanding" University of Rochester, 1994, pp. 23-25.

Agrawal; "Fast Discovery of Association Rules" in Advances in Knowledge Discovery and Data Mining Fayyad UM Piatesky-Shapiro G Smyth P & Uthurusamy R(eds,) AAAI Press Menlo Park California, (1994) pp. 307-328.

Porter, M.F.; "An Algorithm for Suffix Stripping" Program v 14, n3, Jul. 1980, pp. 130-137.

van Rijsbergen, C.J.; "Information Retrieval" Butterworths, Department of Comuting Science, University of Glasgow, 1979.

Shen, H.T., Ooi, B.C., Tan, K.-L.; "Giving Meanings to WWW Images" In Proceedings of the 8th ACM International Conference on Multimedia, 2000, pp. 39-48.

Chen, Z., et al.; "Web Mining for Web Image Retrieval", Journal of the American Society for Information Science and technology, 52(10), Aug. 2001; pp. 831-839.

Gong, Y., et al.; "An Image Database System with Content Capturing and Fast Image Indexing Abilities", In Proceedings of IEEE International Conference on Multimedia Computing and Systems, 1994, pp. 121-130.

Ono, A.; "A Flexible Content-Based Image Retrieval System with Combined Scene Description Keyword", In Proceedings of IEEE International Conference on Multimedia Computing and Systems, 1996, pp. 201-208.

Lu, et al., "A Unified Framework for Semantics and Feature Based Relevance Feedback in Image Retrieval Systems" In: Proc. of the 8th ACM International Conference on Multimedia 2000 pp. 31-38.

* cited by examiner

MEDIA AGENT

RELATED APPLICATION

This patent application is a divisional of co-pending U.S. patent application Ser. No. 09/998,092, which is titled "A Media Agent", filed on Nov. 30, 2001.

TECHNICAL FIELD

The following description relates to use of multimedia.

BACKGROUND

The number of images and other types of media content that are available to users via their computers, especially with the evolvement of the Internet, has become very large and is continuing to grow daily. For instance, people often download media content such as multimedia files, images, videos, audio, and so on from the World Wide Web (WWW). Additionally, a number of known computer programs simplify user generation of personalized media files. Moreover, multimedia files are often used to enhance documents and are typically distributed via e-mail as attachments.

It is very difficult to manage and utilize large and dynamic sets of media content or multimedia data (e.g., media from a web page, an email attachment, a multimedia generation tool, and so on.) once it is accessed or saved into a user's computing environment. For instance, once such data are saved into local folders, substantial numbers of accumulated multimedia files are typically never used again because they are difficult for the user to locate (e.g., through a search). This is often the case because media files themselves may be stored in an ad-hoc manner.

One conventional technique to facilitate a user's explicit search for media content requires the manual annotation of media content to identify semantics of the media. This technique is substantially limited for a number of reasons. One problem with this conventional technique to identify image semantics is that an image must be manually annotated prior to the user's actual search for media content corresponding to the image. Another problem with this technique is that manually annotating multimedia to include text is a tedious process that is prone to human subjectivity and error. In other words, what one person may consider to be semantically related (e.g., the subject matter, pertinent, interesting, significant, and so on) to a particular image may be quite different from what another person may consider to be semantically related to the particular image.

Another conventional technique to facilitate a user's explicit search for media content analyzes text on a Web page text to identify semantics of images displayed on the page. This analyzed text is compared to the user's search query. If it matches to some extent, then the Web page may include media that is related to the user's search. This technique is substantially limited in that images on a Web page may have semantics other than what is specifically recited with the text on the Web page.

The following arrangements and procedures address these and other problems of managing and accessing multimedia data.

SUMMARY

Systems and methods for a media agent are described. In one aspect, user access of a media content source is detected. Responsive to this detection, a piece of media content and associated text is collected from the media content source. Semantic text features are extracted from the associated text and the piece of media content. The semantic text features are indexed into a media database.

BRIEF DESCRIPTION OF THE DRAWINGS

The same numbers are used throughout the drawings to reference like features and components.

FIG. 3 shows sequences in which data transfer, use, and transformation are performed during the execution of the media agent.

FIG. 4 shows a procedure to determine whether offline gathering of media content semantics, online gathering of media content semantics, preference and intention modeling, or user intention prediction and suggestion procedures should be performed.

FIG. 5 shows further aspects of a procedure for a media agent of FIGS. 2 and 3 to perform online gathering of media content semantics and preference and intention modeling.

FIG. 6 shows further aspects of a procedure for a media agent of FIGS. 2 and 3 to determine whether preference and intention modeling or user intention prediction and suggestion procedures should be performed.

DETAILED DESCRIPTION

The following description sets forth exemplary subject for a media agent to semantically index, suggest, and retrieve media content and other information corresponding to media content according to a user's personal media use patterns. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

As discussed in the background section, using conventional techniques it is very difficult to manage and utilize large and dynamic sets of media content once it is accessed or saved into a user's computing environment because media files themselves may be stored in an ad-hoc manner. However, this is also the case because locating a particular multimedia file that is relevant to a context within which the user is working (i.e., the user's intent) is a substantially difficult problem. And, unless the user is performing an explicit search for media content, none of the described conventional procedures take into account multimedia content needs of the user within the context that he or she is working.

In contrast to such conventional procedures, the following arrangements and procedures provide for an intelligent media agent to autonomously collect semantic multimedia data text descriptions on behalf of a user whenever and wherever the user accesses multimedia data. The media agent analyzes these semantic multimedia data text descriptions in view of user behavior patterns and actions to assist the user in identifying multimedia content that is appropriate to the context within which the user is operating or working. To accomplish this, the media agent provides timely prompts with suggested multimedia content and/or information corresponding to media content (e.g., suggested media filenames).

Figure 1:
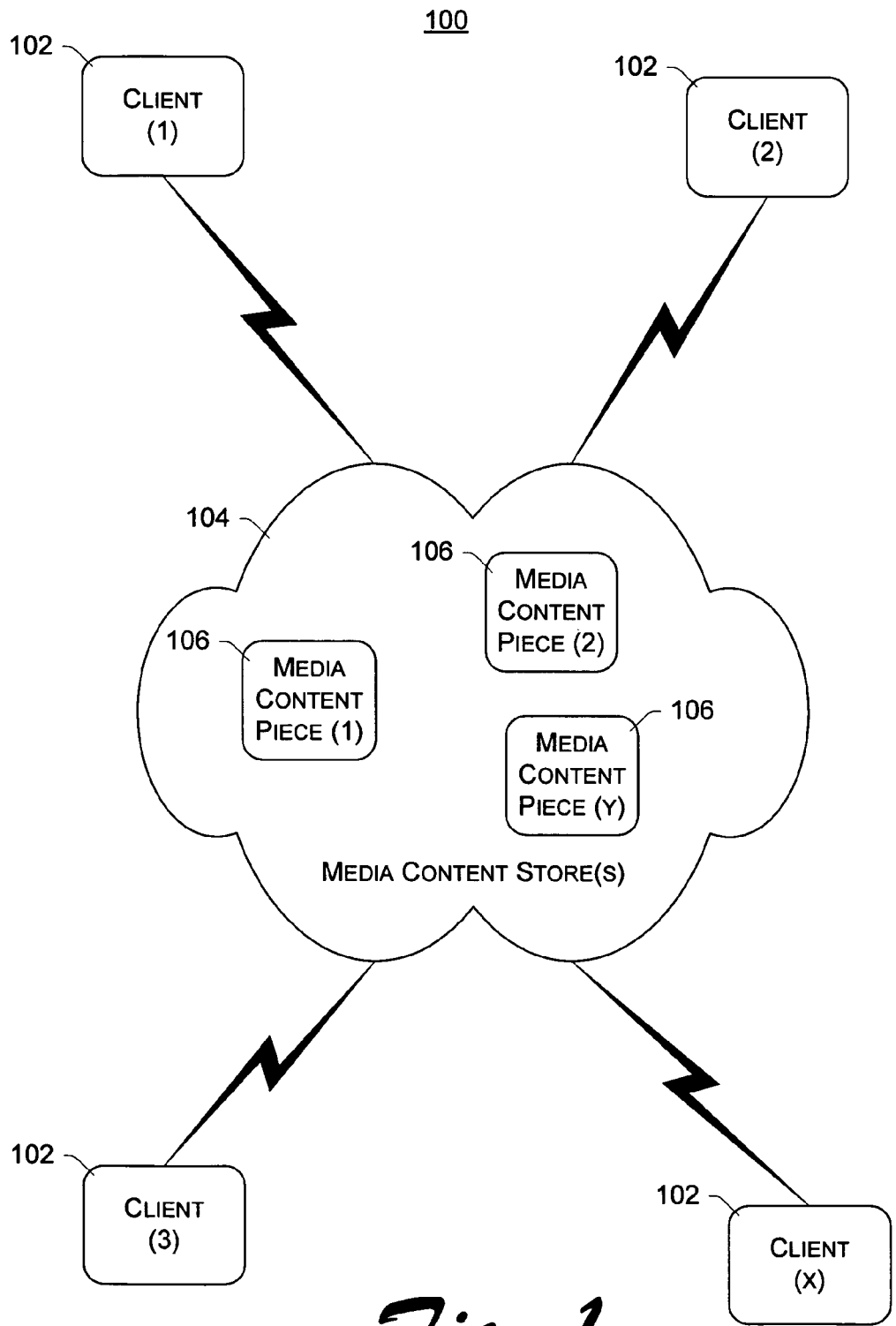
FIG. 1 illustrates an exemplary environment in which the invention can be practiced.

FIG. 1 illustrates an exemplary environment to identify a context within which the user or client is working and suggest semantically related multimedia content for the client to work with based on the identified context. In environment 100 one or more (x) clients 102 are coupled to a media content store 104. The media content store 104 is any combination of local storage (e.g., local volatile or non-volatile memory), networked storage (e.g., a parallel connection, an organizational intranet network, the Internet, and so on), or other communication configurations.

These communication configurations provide for electronic exchange of information using an appropriate protocol (e.g., TCP/IP, UDP, SOAP, etc.) between the host device 102 and one or more media content sources or servers that include multiple (y) pieces of media content 106. This electronic exchange provides for client 102 communication with media content store 104 to access (e.g., view, search, download, etc.) pieces of media content 106.

The storage of media content pieces 106 within media content store 104 can be arranged in any of a wide variety of manners and according to any of a wide variety of data formats. For example, media content pieces 106 may be stored on multiple servers hosting Web pages accessible via a network using an appropriate protocol such as Hypertext Transfer Protocol (HTTP). Web pages are documents that a user can view or otherwise render and which typically include links to one or more other pages that the user can access. Web pages are typically stored as one or more files at a remote location(s), being accessed by the user via a computer that is operatively coupled to a network. Web pages often include multiple pieces of media content 106.

Media content pieces 106 include any of a wide variety of conventional media content, such as audio content, video content (for example, still images or frames of motion video), multimedia content, etc. A piece of media content 106 refers to media content that can be rendered, such as a single visual image, an audio clip (e.g., a song or portion of a song), a multimedia clip (e.g., an audio/video program or portion of an audio/video program), etc. The described arrangements and procedures can be used with a wide variety of conventional media content.

In the illustrated example, a user of a client 102 accesses the media content store 104 for pieces of media content 106. The client 102 automatically detects a user's access or utilization of a media object 106 (e.g., an image, a chart, an audio, a video, an Excel® file, etc.) and collects semantic text descriptions of the accessed media object 106 during its use. These media object descriptions are extracted from text associated with an accessed media content piece 106.

Media content 106 may coexist with corresponding text description. The source of the text description may be part of the multimedia content itself or can be independent but semantic to the content. For instance, an e-mail message may describe attached media content (e.g., an attached image or video clip). Many other composite documents, including slide files, word processor documents, and so on, also commonly include both media content and corresponding text. All of these files can be used as potential sources of semantic features of media data. Thus, the client 102 collects or extracts semantic features of a media file from text descriptions from the media content's environment (e.g., the Web page, the e-mail, the compound document, and so on).

As a user operates within the computing environment of a client 102, the client 102 monitors the user's activities and provides suggestions of semantically related media content 106 to use based on these user activities in view of the collected media object descriptions. For instance, after authoring a paragraph of text description during preparation of a technical report, a user indicates that he or she wants to insert some multimedia content 106 (e.g., a diagram). (There are any numbers of ways for the user to author such a paragraph such as via user input with a keyboard, a stylus, a mouse or other pointing device, voice recognition, and so on). The client 102 anticipates the desire to insert the content and/or the particular content that the user wishes to insert. This is accomplished by mapping information from surrounding text description (e.g., text above, below, or to the sides of the media content insertion point) to user prediction and preference patterns and stored multimedia data text descriptions. Using this information, a list of one or more anticipated multimedia items is presented (e.g., in a dialog box) to the user for user selection. An example of this is described in greater detail below in reference to FIG. 8.

An Exemplary System

Figure 2:
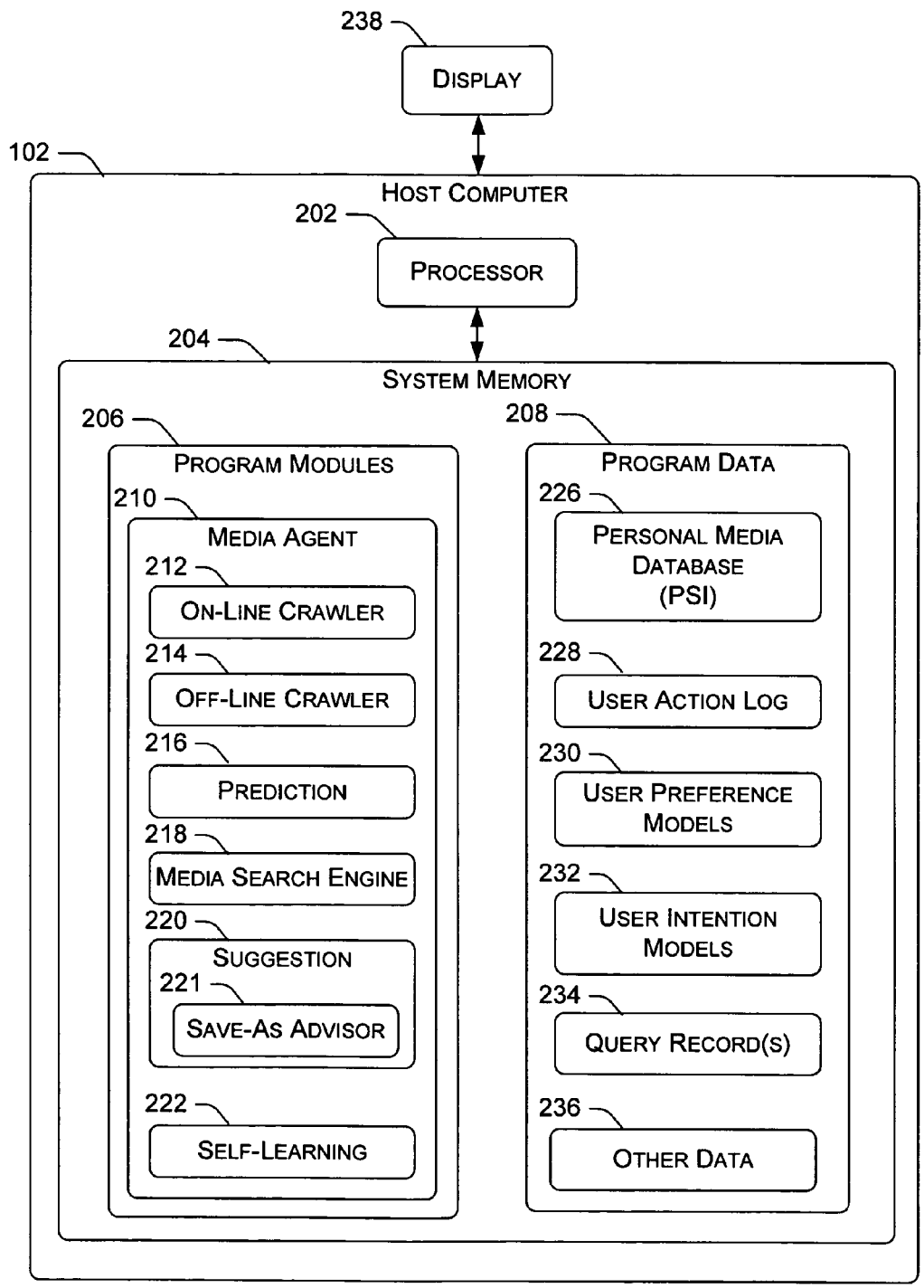
FIG. 2 shows an exemplary host computer to semantically index, suggest, and retrieve media content according to personal usage patterns.

FIG. 2 shows an exemplary host computer 102 to semantically index, suggest, and retrieve media content according to personal usage patterns. The host computer 102 is operational as any one of a number of different computing devices such as a personal computer, an image server computer, a thin client, a thick client, a hand-held or laptop device, a multiprocessor system, a microprocessor-based system, a set top box, programmable consumer electronics, a wireless phone, an application specific integrated circuit (ASIC), a network PC, minicomputer, mainframe computer, and so on.

The host computer includes a processor 202 that is coupled to a system memory 204. The system memory 204 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM.

The processor 202 is configured to fetch and execute computer program instructions from program modules 206; and configured to fetch data 208 while executing the program modules 206. Program modules typically include routines, programs, objects, components, data structures, etc., for performing particular tasks or implementing particular abstract data types. For instance, program modules 206 include the media agent module 210, and other applications (e.g., an operating system, a Web browser application, and so on).

The media agent module 210 includes on-line crawler 212 and off-line crawler 214 modules, a prediction module 216, a media search engine 218, a suggestion module 220, and a self-learning module 222, each of which are described in greater detail below. The media agent module 210 automatically detects user actions with respect to media content to trigger one or more appropriate modules 212 through 222. Media content (e.g., Web pages, composite documents that include media content such as e-mails, word processing files, and so on) refers to any one or more of the media content pieces 106 of FIG. 1 and/or media represented in a user's personal media database 226. . Actions with respect to media content include, for example: accessing a URL (e.g., with respect to a media content piece 106), creating a media object, importing or downloading a media object, inserting a media object (e.g., into a document), opening, saving, updating or editing a media object, exporting or uploading a media object 106, and so on.

The Online and Offline Media Content Crawler Components

The online 212 and offline 214 crawler modules are triggered at various times to: (a) collect potentially related high-level features (also referred to herein as semantic text features) of a media object from a composite document (e.g., an e-mail, Web page, or word processing document); (b) extract semantic text features from the media object itself; and (c) index the media object in the personal media database 226 using the collected and extracted semantic text. A composite document includes both media content and corresponding text (e.g., an e-mail message with an attached picture or slide file, word processor documents, etc.). For instance, if the composite document is an e-mail with an attachment, the crawlers 212 and 214 may extract semantic text features (e.g., words) from both the body of the e-mail message and from the attached media content piece itself.

Specific actions that trigger the on-line crawler module 212 include, for example: visiting a URL, saving/downloading a media object from the Web or an email, saving a media hyperlink from the Web, inserting a media object or its link into a document or an e-mail, and so on. The off-line crawler module 214 is activated at system 102 idle time to collect and index semantic text corresponding to media objects local or remote to the host 102 (e.g., the media content pieces 106 of FIG. 1) that are similar to the user's preferences models 230. (User preferences models 230 are described in greater detail below).

Media content semantic text features are extracted by crawlers 212 and 214 in a variety of different manners. For instance, text features are extracted based on up to six aspects of the text associated with media content: (1) a filename and identifier, (2) an annotation, (3) alternate text, (4) surrounding text, (5) a page title, and/or (6) other information. Note that all of these aspects may not be associated with each media content piece, and thus features are not extracted based on aspects that are not available for the media content piece.

(1) Image filename and identifier: each image is identified by a filename that is typically part of a larger identifier that indicates where the file is located (e.g., a URL). Often meaningful names are used as filenames and/or the identifier (e.g., URL) for an image. Each word in the filename and identifier can be used as a text feature. In one implementation, a set of rules is used to judge the usefulness of the filenames and URL for an image, and thereby limit the words used as text features.

One rule is that the filename be segmented into meaningful key words. Based on a standard dictionary (or alternatively a specialized dictionary), the filename is analyzed to determine whether it includes one or more words that are in the dictionary. Each such word is identified as a key word. For example, the filename "redflower.jpg" would be segmented into the key words "red" and "flower", each of which would be a text feature (assuming they each existed in the dictionary).

Another rule or criteria is that certain common words (e.g., articles) are excluded from being considered key words. For example, the filename "theredflower.jpg" could be segmented into the words "the", "red", and "flower", but only "red" and "flower" would be text features (the word "the" is a stop-word and thus not identified as a key word). Other insignificant characters and groups of characters can also be excluded, such as digits, hyphens, other punctuation marks, filename extensions, and so on.

Another rule applies to the URL for an image. A URL typically represents the hierarchy information of the image. The URL is parsed and segmented to identify each word in the URL, and then resulting meaningful key words are used as text features. For example, in the URL ". . . /images/animals/anim_birdsjpg", the words "animals" and "birds" are meaningful key words that would be extracted as images. A dictionary can be used to identify the meaningful key words as discussed above. For example, the word "images" would not be meaningful as only images are being analyzed.

Image annotation: each image can have a corresponding image annotation which is a text label describing the semantics of the image, typically input by the creator of the image file. This image annotation is intended to describe the semantics of the image. Thus, each word in the image annotation may be a key feature (although certain common words and/or insignificant characters/character groups can be excluded as discussed above regarding image filenames and identifiers).

Alternate text: many web pages include alternate text for images. This alternate text is to be displayed in place of the image in certain situations (e.g., for text-based browsers). As this alternate text is intended to replace the image, it often includes valuable information describing the image. Thus, each word in the alternate text is a key feature (although certain common words and/or insignificant characters/character groups may be excluded as discussed above regarding image filenames and identifiers).

Surrounding text: many web pages have text surrounding the images on the rendered web page. This text frequently enhances the media content that the web page designers are trying to present, and thus is frequently valuable information describing the image. Thus, key words from the text surrounding the image (e.g., text above the image, below the image, to the left of the image, and to the right of the image) are extracted as text features (certain common words and/or insignificant characters/character groups may be excluded as discussed above regarding image filenames and identifiers). The amount of text surrounding an image from which key words are extracted can vary. For instance, the three lines (or sentences) of text that are closest to (adjacent to) the image are used, or alternatively the entire paragraph closest to (adjacent to) the image can be used. Alternatively, if information is available regarding the layout of the web page, then the single sentence (or line) most related to the image can be used.

Page title: many times a web page will have a title. If the web page does have a title, then key words are identified in the title and used as text features (certain common words and/or insignificant characters/character groups may be excluded as discussed above regarding image filenames and identifiers).

Other information: other information from the web page may also be used to obtain words to be used as text features associated with an image. For example, each URL on the page that is a link to another web page may be parsed and segmented and meaningful key words extracted from the URL (analogous to the discussion above regarding extracting meaningful key words from the URL of the image). By way of another example, meaningful key words may be extracted from "anchor text" that corresponds to the image. Anchor text refers to text that is identified on the web page as text that should be kept near or next to the image (e.g., which would cause the browser to move the text to a next page if the image were to be displayed on the next page). Key words can be extracted from the anchor text analogous to the discussion above regarding extracting meaningful key words from the alternate text.

After applying these various rules, the crawler 212 or 214 has a set of words that are text features extracted from the image. Note that certain words may be extracted multiple times and thus appear in the set multiple times. The crawler module 212 or 214 stores these high-level semantic text features and an identifier of the media content piece (e.g., a URL) in personal media content and features database 226. The media content piece itself may also optionally be stored in a separate database 236 from the high-level semantic text features.

The extracted high-level text features are a set of words. The crawler module 212 or 214 takes the extracted features for media content from personal media content database 226 and indexes the media content piece. These generated feature vectors or indices are stored in personal media content database 226 or alternatively elsewhere. The indexing process refers to generating, as necessary, feature vectors corresponding to the media content piece and storing a correlation between the generated feature vectors and the media content piece.

The crawler module 212 or 214 converts the extracted high-level text features into a text feature vector $D_i$ for image i using a well-known TF*IDF method:

$$D_i = TF_i * IDF_i = \left(t_{il} * \log\frac{N}{n_1}, \ldots, t_{ij} * \log\frac{N}{n_j}, \ldots, t_{im} * \log\frac{N}{n_m}\right) \quad (1)$$

where m represents the total number of different keywords maintained in database 226, $t_{ij}$ represents the frequency of keyword j appearing in the extracted set of words associated with image i, $n_j$ represents the number of images identified in database 140 that contain the keyword j, and N represents the total number of images in database 140. Each keyword in the text feature vector of an image is thus weighted based on how frequently it appears in the text associated with the image as well as how frequently it appears in the text associated with all images identified in database 226. The resultant text feature vector $D_i$ for image i thus includes a numerical element for each word that is in the text associated with at least one image identified in database 226 (if the word is not associated with image i then the value for that element is zero).

Each time new high-level semantic text feature vectors are added to database 228, the previously generated feature vectors are re-generated, crawler modules 212 and 214 may generate (and re-generate) feature vectors based on the features in database 226 as soon as new features are added to database 226, or alternatively wait for multiple new features to be added to database 226, or wait for a particular time (e.g., wait until early morning when fewer users will be accessing a computer's resources).

Accordingly, the personal media database 226 is personal to a particular user because it indexes all media objects that the particular user has accessed or accumulated from the digital world, including media content from the Web, the local machine 102, and all other media content stores 104 such as e-mail and other composite documents. Once accumulated or otherwise accessed media content is indexed by semantic text features, text-based search of the media files is possible.

For instance, U.S. patent application Ser. No. 09/805,626 to Li et al., filed on Mar. 13, 2001, titled "A Media Content Search Engine Incorporating Text Content and User Log Mining", which is assigned to the assignee hereof and hereby incorporated by reference, describes searching a database using semantic text features of media content.

The User Prediction Component

The prediction module 216 monitors a user's typing actions and guesses or anticipates whether the user may want to insert a media object based on the user intention model 232, which is described in greater detail below. To precisely predict the user' intention, the prediction module 216 generates the user intention model 232 based on a set of training data 236. For instance, the user's intention can be modeled using a Bayesian Belief Network (BBN) to represent probabilistic relationships among three levels of semantic features: lexicography or "lexics", syntax, and patterns. BBNs are known tools to represent probabilistic relationships. The user intention modeling process is presented in greater detail below in reference to the learning module 222.

The prediction module 216 uses the user intention model 232 and typed user text information to anticipate whether the user may want to insert a media file, and if so, the type of media file to insert. Specifically, the prediction module 216 extracts a set of keyword features from the text that the user has just typed and inputs the extracted keyword features to the BBN. The probabilities of all predefined user intentions are calculated based on the input keyword features and the one with the largest magnitude is chosen as the predicted user intention.

The prediction module 216 may determine or predict that a user desires to use/insert a media file into a document based on what a user types. This information can be used to predict even the context of the media file(s) that the user may wish to access. For instance, when the user is writing a document (e.g., an email), after the user types in text such as "The following are some pictures of digital cassette recorder", the prediction module 216 analyzes the text to guess that the user may want to insert some pictures of a digital cassette recorder, and therefore automatically activate the media search engine 218, which is discussed in greater detail below, to locate media content that corresponds to digital cassette recorders.

Figure 8:
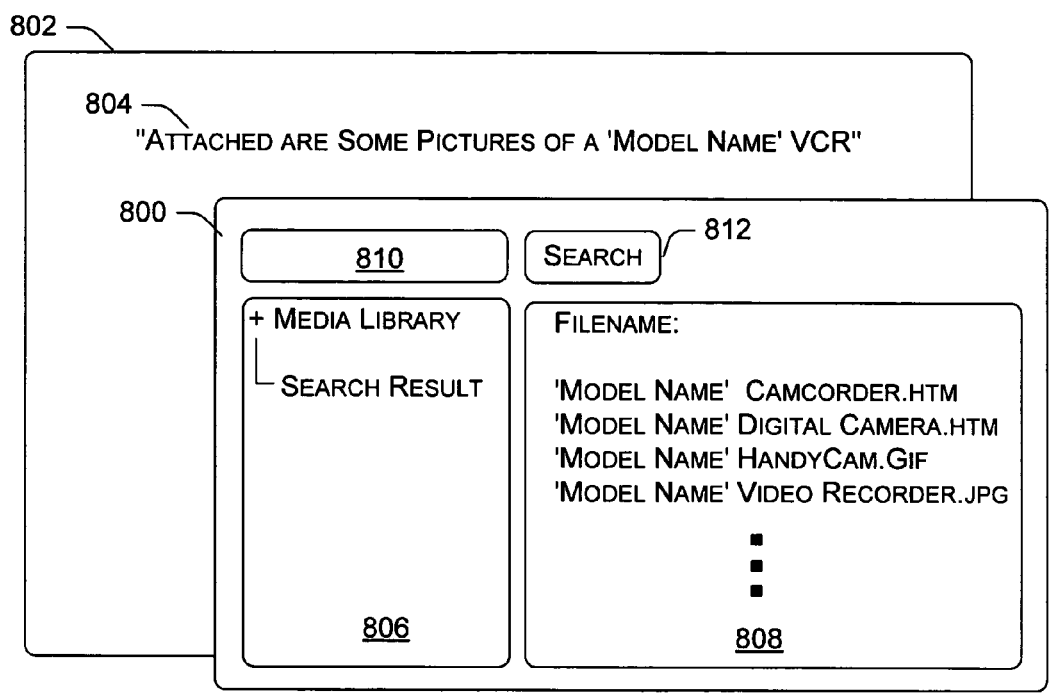
FIG. 8 shows an exemplary user interface to present media suggestions (e.g., filenames) for a user to select based on what the user has typed into a window such as an e-mail message or other document.

FIG. 8 shows an exemplary user interface 800 to present media suggestions (e.g., filenames) for a user to insert into a document 802 based on what a user has typed 804 into a window (e.g., an e-mail message). In this example, the user has typed text 804 into an e-mail application window 802. The text 804 indicates that "Attached are some pictures of 'model name' VCR". The prediction module 216 analyzes this text 804 to guess that the user may want to "attach" some "pictures" of a video cassette recorder (i.e., "VCR") into the e-mail message 802. Responsive to this guess, the media search engine 218 (discussed below) is activated to locate media content that corresponds to VCRs. Upon locating such corresponding media this information is presented (e.g., by the suggestion module 220—which is discussed in greater detail below) to the in a window 800 (e.g., a media player window).

The media player window 800, in this example, includes an area 806 to indicate that the search result has been incorporated into the media library or personal media database 226. Window 808 indicates suggested media content (e.g., filenames) based on the user input text 804. The user can simply select and drag and drop the suggested media content 808 into the document 802 if one or more of the suggestions are correct. The suggestions 808 can also be edited to more closely approximate or indicate desired content—or simply ignored by the user (e.g., a cancel button on a dialog box can be selected).

Windows 800, and 806-812 represent only an example of a user interface with which to present suggested media content to a user based on the media agent's 210 determination that a user desires to insert media content into a document. For instance, there are a number of different ways for the media agent to detect the user's desire to insert media content. The user may select a drop-down menu item to indicate that an image is to be inserted at the current location in the document, information in text surrounding an insert point (e.g., "see the following diagram") may indicate that media content is to be inserted, and so on.

More details of the prediction process 216 are presented below in reference to the user intention model 232.

The Search Engine Component

If it is determined that the user wants to access media content (e.g., to insert something into a composite document), the media agent 210 uses the media search engine 218 to locate relevant media objects based either on a search query that is explicitly specified by the user or automatically guessed by the prediction module 216.

A user generates a search query by inputting a textual description of the search criteria pertaining to the types of media content desired. The textual description is then converted to a text feature vector and stored as a query vector 234; otherwise the prediction module 216 has automatically generated the query vector 234 responsive to user actions (e.g., typing text).

A query vector 234 is generated by extracting keywords from search criteria (e.g., user input) and building the query vector (having the same number of elements as the semantic text feature vectors in database 226, and each element corresponding to the same keyword as the corresponding element in the text feature vectors) by assigning a value of one to the element corresponding to each extracted keyword and a value of zero for the other elements. If an image is used for the search criteria, then keywords of any text description corresponding to that image are extracted and used to generate the initial high-level query vector. The keywords can be extracted in the same manner as discussed above with reference to online and offline crawler modules 212 and 214.

The high-level query vector 234 is then generated by assigning a value of one to the element corresponding to each extracted keyword and a value of zero for all other elements. If the image retrieval process is initiated based on both an input text description and an input image, the high-level query vector is generated based on extracted keywords from both the input text and the input image. For example, initial vectors may be generated as discussed above (assigning a value of one to the element corresponding to each keyword), and then the vectors combined (e.g., elements added together or averaged on a per-element basis) to generate the initial high-level query vector 234.

The search engine 218 uses a matching algorithm to determine the most relevant media objects that match to the user's intent represented by the generated query vector 234. The matching algorithm calculates semantic similarity between the query vector 234 and each media object represented in the personal media database 226. Semantic similarity is calculated using a dot product of the query's semantic feature vector 234 and the media object's semantic feature vector.

For instance, the similarity, referred to as $S_h(q_h, D_{i_h})$, between the high-level query vector $q_h$ and the high-level feature vector of the image $D_i$, referred to as $D_{i_h}$, is calculated using the dot product of the query's text feature vector and the image's text feature vector as follows, which is a normalized similarity.

$$S_h(q_h, D_{i_h}) = \frac{q_h \cdot D_{i_h}}{|q_h||D_{i_h}|}.$$

The Suggestion Component

Once the search engine finds a set of relevant media objects in the personal media database 226, the suggestion module 220 shows (e.g., via the display 238) search engine 218 results to the user in a sorted list (e.g., in a dialog box) according to their semantic similarity to the query vector 234. Each object is displayed with a short paragraph of text or a few keywords to describe its content. The user may select an item from the list for acceptance. For instance, the user may select a suggested item by double clicking it or by dragging and dropping one or more of the suggested items from the display into a document.

Additionally, if the user places a cursor over a suggested item such as a suggested media content item or filename, the suggestion module 220 may display all or a portion (e.g., keywords) of the semantic text stored in the personal media database 226 that corresponds to the suggested item. This additional information can be displayed in a number of different ways such as in a hovering window near the cursor hot-point, in a status bar, and so on. Moreover, the user may decide at this point to modify the semantic descriptions of the media objects in the database 226 to more particularly indicate the semantics of the media content.

Additionally, when a user wants to save or download a media object (e.g., a multimedia file, html file, audio file, video file, image file, and so on) from a media source such as from the Web or from an e-mail message, the suggestion module 220 can include a "save-as" advisor 221 to present one or more suggested filenames for the user to utilize to save or download the media object to the personalized media database 226. These filenames are presented in a "Save-As" dialog box or window on the display 238 and are based on semantic features that are extracted from the media object and/or the media source. Such semantic features include, for example, filenames, surrounding text, page titles, hyperlinks, and so on. These semantic features are extracted from the media source by the on-line crawler 212.

For instance the "save as" advisor 221 is activated when a user wants to save or download a media object from the Web (i.e., a Web page). The "Save As" Advisor automatically collects and extracts semantic information such as one or more keywords from the Web page. From these extracted keywords, the advisor suggests a list of corresponding filenames for a user to select. The user can modify or choose a suggested filename to use as the filename of the saved media object on the local machine 102.

The Learning Component

Learning is a significant aspect of the media agent 210. The media agent 210 improves performance based on relevance feedback from user interactions with the system. The users' interactions are recorded in the user action log 228. The self-learning mechanism of the media agent 210 is implemented in a number of aspects, including: (a) learning to refine semantic features of accumulated media files; (b) learning user preferences models for automatically indexing non-visited but relevant media files; and (c) learning the user intention model 232 to provide more accurate suggestions to a user.

Responsive to user selection of one or more of the suggestion module 220 displayed suggestions, the learning module 222 automatically refines the semantic features of the search query 234 and updates the semantic indexing of the media objects in the personal media database 226. To accomplish this, the learning module 222 accesses relevance feedback from the user log 228 and updates the query vectors to reflect the relevance feedback provided by the user. The query vector 234 is modified as follows:

$$Q' = Q + \beta \frac{\sum Q^+}{n^+} - \gamma \frac{\sum Q^-}{n^-}$$

where $Q'$ represents the updated query vector, $Q$ represents the original query vector, $Q^+$ represents the set of feature vectors of user selected media content, $n^+$ represents the number of user selected media content, $Q^-$ represents the set of feature vectors of the non-selected media content, $n^-$ represents the number of non-selected media content, $\beta$ represents a weighting for positive feedback, and $\gamma$ represents a weighting for negative feedback. Initially, the values of $\beta$ and $\gamma$ are set empirically, such as $\beta=1.0$ and $\gamma=0.5$. Alternatively, if some training data is available, the parameters can be tuned using the training data to improve the performance of the retrieval.

If a query vector 234 did not previously exist, then an initial query vector 234 is generated based on the relevance feedback. For example, feature vectors of the relevant images may be averaged together to generate a corresponding semantic text query vector to store in the personal media database 226.

In this manner, suggested semantic features that result in positive user feedback are reinforced in the personal media database 226. Additionally, by learning from the user's log 228 of whether the user accepts or rejects suggestions, the media agent 210 determines appropriate times to provide suggestions, potentially saving processing time (e.g., searches). Additionally, user habits can be determined to anticipate when media content suggestions (i.e., provided by the suggestion module 220) may or may not be desired. Additionally, frequently accessed media files usually show the user's preferences and profiles, which can be learned more precisely by recording user actions over a period of time. Once a user preference model 230 is known, the media agent 210 (i.e., the online or offline crawlers 212 and 214) may automatically collect media objects pertaining to the user's interests from various media content sources 104.

The User Intention Modeling Component

The self-learning mechanism 222 also includes user intention modeling 232 and preference modeling 230 based on the log 228 of a user's actions on accumulated media content. Many kinds of user activities, including mouse movement and typing can be used to learn and predict the user's intentions. For instance, when the user is writing a new e-mail and has typed "Here is an interesting picture download from the web", the probability of the user's intention of inserting an image into the e-mail body as an attachment is very high. Therefore, the media agent 210 (i.e., the prediction module 216) can predict that user wants to insert an image in the e-mail. If the user's intention is to insert, the suggestion module 220 can provide potential images for the user to insert based on other text information the user has typed or will type.

All text factors that may imply the user's intentions are referred to as linguistic features. A Bayesian Belief Network is used to precisely represent the dependencies and probabilities among the linguistic features and the user's intentions. Three levels of linguistic features are defined: lexics, syntax, and a partial or completely instantiated sentence pattern. A lexical feature is a single word extracted from the text. A syntactical feature is the syntax structure of a sentence. An instantiated pattern feature is a frequently used sentence structure with some of its syntactical units instantiated with certain words or phrases, e.g., "Here it is a . . . " and "Attached please find . . . " The particular Bayesian Belief Network used to represent the user's intention model 232 is illustrated below in table 1.

TABLE 1

Example of User Intention Modeling using a Bayesian Belief Network

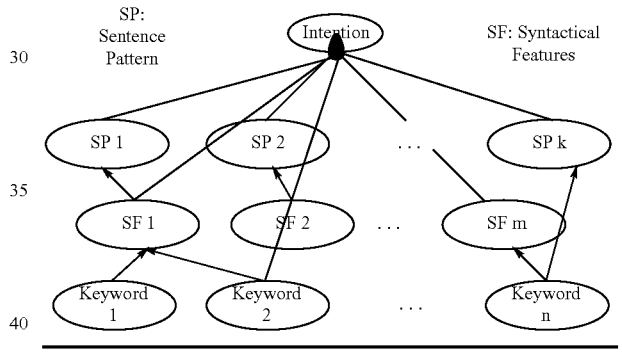

Initially, the user intention model of Table 1 is empty but is subsequently learned using the user's log 228 (a set of user action records) as training data. The user's log 228 records user action records to train the intention model. Each user action record contains a text part and a tag of whether a media file is attached. For instance, an e-mail message could have a text body and a media file attachment. The text part is parsed such that all words (lexical features) are extracted from the sentences and are stemmed.

At the lexical level, direct association between keyword features and user intentions is determined through training. A fast algorithm proposed by Agrawal et al. [1] can be used to generate rules for determining associations between keywords and intention(s). The rules represent the causality relationship between keywords and intentions.

For example, a set of rules identify whether there is a causal relationship between certain keywords and the intention to insert a media file. The causality rules are further constrained by two parameters: $\alpha$ (Support of Item Sets) and $\beta$ (Confidence of Association Rule). The first parameter ($\alpha$), which depicts a scope that the rules can be applied to, is expressed by the percentage of those records that contain the same keyword as evidence. The second parameter ($\beta$) depicts the probability that the rule stands, i.e., the probability of the intention given the appearance of the keyword. The generated rules are evaluated based on the values of these two parameters. The higher the two values, the better the rules. Those rules with parameters higher than certain thresholds (e.g., $\alpha=0.03, \beta=0.6$) are selected to build the Bayesian Belief Network.

The Intention Prediction Process

Once direct associations between keyword features and user intentions are determined through training, the intention model 232 for a user can be used by the prediction module 216 to predict the user's intention based on what the user has just typed.

To accomplish this, a set of keyword features represented by ($<a_1, a_2 \ldots a_n>$) are extracted from the text typed by user. The prediction module 216 then calculates the probabilities of all predefined user intentions (V), and selects the intention with the biggest probability ($v_{map}$) using the following equation [11].

$$v_{map} = \underset{v_j \in V}{\mathrm{argmax}} P(v_j \mid a_1, a_2, \ldots, a_n) \quad (2)$$
$$= \underset{v_j \in V}{\mathrm{argmax}} P(a_1, a_2, \ldots, a_n \mid v_j) P(v_j)$$

where $P(a_1, a_2, \ldots, a_n \mid v_j) = \prod_{i=1}^{n} P(a_i \mid \mathrm{Parents}(a_i), v_j).$ In addition to lexical features, other informative features are used to precisely predict the user's intentions. For instance, natural language processing (NLP) technologies can be utilized to analyze sentence structures of the text. NLP can analyze a sentence and parse it into a tree structure. The highest-level sentence structures are utilized.

For example, "Here are some photos" is parsed into the following sentence structure: AVP ("here"), VERB ("be"), NP ("some photos"), wherein "AVP" represents an indication of an adverb phrase element, and "NP" represents a noun phrase element. Such syntactical features are used to determine additional useful information. This method [1] can also be used to generate association rules between these syntactical features and user intentions.

Use of syntactical features improves user intention prediction precision. However, certain sentence patterns, such as, "here is something" in an e-mail message typically indicates that a user intends to insert an attachment. The sentence structure is AVP+VERB+NP. Yet, the sentence "how are you" has the same structure and indicates a different intention. Therefore, parts of the sentence structure are further evaluated to locate instantiated patterns that may strongly indicate user's intentions. An instantiated pattern is a sentence structure specified with a pattern of words.

The rules generated at the lexical level using the method of [1] are substantially specific and lack complete representation of user intent. Hence, association rules are generated for instantiated pattern features based on the association rules found between syntactical features and user intentions. By instantiating parts of the syntactical features with certain frequently used words or phrases, association rules are generated at the instantiation pattern level, which is more general than the syntax level rules and more specific than the lexics level rules.

Since each syntactical unit can be replaced by many words, all combinations of words found in the training data and syntactical units are tested in a breadth-first order. Only those instantiated patterns that have $\alpha$ and $\beta$ parameters (of the association rules) that are greater than certain thresholds are selected for user intention prediction.

The User Preferences Modeling Component

A user model includes many things about a user. The association rules and the intention models discussed above are part of the user intention model 232. This section focuses on how to identify user interests and preferences (e.g., the user preference model 230) from the user's interaction history with the media agent 210 as identified in the user action log 228.

User preferences are modeled by analyzing semantic features of the media files that the user has accumulated and frequently used. By doing so, a scope of media contents matching user interest is identified. Once user preferences models 230 are identified, the media agent 210 provides appropriate suggestions (e.g., via the suggestion module 220) or preferred media files automatically collected from all possible sources by the offline crawler 214. Additionally, media files on the local machine 102 can be automatically and periodically sought for better indexing, clustering, and/or classification. Moreover, media files can be shared with other users that have similar user preferences models 230.

To improve user preference modeling, several different preference models, each of which can be represented by a list of keywords, can be maintained for a user. For instance, all user log records 228 are clustered into several preferences clusters based on their semantic similarity. The semantic similarity for two keyword vectors is calculated using their dot product and normalized through the cosine method [5] [13] (these methods were discussed above in reference to determining semantic similarity with respect to search engine 218 results). Each cluster corresponds to a preference model 230 for the user, which is represented by a keyword frequency vector formed by the top 10 frequently used keywords (except for stop words) and their frequency in the user log cluster. A user preference model is therefore represented by $m=<k_1, k_2, \ldots, k_{10}>$.

Whether a media file or object is of interest to the user also depends on the semantic similarity between the media object and one of the user preferences models 230. The one with the largest similarity value (which is also large enough, e.g., larger than a threshold) is considered as relevant to the user's interest. Similarities between two user preference models 230 are compared by calculating the dot product of their keyword frequency vectors.

Modeling user's preferences based on keyword probability is another approach to determining keyword frequency in text documents. Specifically, the Naïve Bayes approach is used with respect to all words and their probabilities to form a keyword probability vector to model a preference [11]. The probability of word $w_k$ is estimated using the following equation:

$$P(w_k \mid m_j) = \frac{n_k + 1}{n + |\mathrm{Vocabulary}|}, \quad (3)$$

where n is the total number of words (or actually, the total length of text) existing within the training data, which are all user log records in the cluster corresponding to the user preference model $m_j$, $n_k$ is the number of times that word $w_k$ is found among these n words, and |Vocabulary| is the total number of distinct words found in the training data. In comparison, equation (2) is simply the term frequency combined with a smoothing function.

Given a multimedia document D represented by $<w_1, w_2, \ldots, w_n>$, the most probable user preference model $M_{NB}$ is calculated using the Naïve Bayes approach as follows.

$$m_{NB} = \underset{mj \in M}{\text{argmax}} P(m_j \mid w_1, w_2 \ldots w_n) \qquad (4)$$

$$= \underset{mj \in M}{\text{argmax}} P(w_1, w_2 \ldots w_n \mid m_j) P(m_j)$$

$$= \underset{mj \in M}{\text{argmax}} P(m_j) \prod_k P(w_k \mid m_j)$$

$P_{mj}$ is the prior of $m_j$, which can be considered as of a uniform distribution initially. The approach assumes that the probability of a word is independent of others or its position within the text. Note that this assumption is not always true. However, in practice, the Naïve Bayesian learner performs remarkably well in many text classification problems despite this independence assumption [11].

$P(m_j \mid w_1, w_2 \ldots w_n)$ is comparable among different $m_j$, and can therefore be used to find a better model. However, $P(m_j \mid w_1, w_2 \ldots w_n)$ is not comparable among different D, since it differs in magnitude for different lengths of keyword vectors. To judge whether D is of the user's interest, another metric is required that is comparable among different D such that a value larger than a threshold means that the document is of the user's preference. First al all, due to multiple multiplications in equation (3), a geometrical mean is considered in normalizing as follows.

$$\log\left(\sqrt[n_w]{P(m_{NB}) \prod_i P(w_i \mid m_j)}\right) = \frac{\log(P(m_{NB} \mid w_1, w_2 \ldots w_n))}{n_w},$$

where $n_w$ is the number of distinct keywords in document D matched with keywords in the model $M_{NB}$. Secondly, a factor of matched keyword percentage is considered such that the document containing a larger percentage of keywords in D matched in the model will get a higher metric value and is therefore more relevant to the user's preference model. Hence, $$\frac{n_D}{n_w}$$

is multiplied, where $n_D$ is the total number of words in D. Finally, the metric is defined as follows, which is used to measure the relevancy of D to the user's preference model.

$$P_{norm}(D) = \frac{n_D * \log(P(m_{NB} \mid w_1, w_2 \ldots w_n))}{n_w^2}, \qquad (5)$$

Using the Bayesian method, the similarity between two user preference models is calculated. One of the metrics follows:

$$\text{Sim}(m_1, m_2) = \frac{P(m_1 \mid m_2) + P(m_2 \mid m_1)}{2}, \qquad (6)$$

where, $m_1$ and $m_2$ are two user preference models represented by two keyword vectors.

The Semantic Feature Refinement Component

It is not initially known whether a text paragraph in a document is relevant to a media object in the same document. In light of this, the media agent 210 may save many features surrounding the media object. These saved or extracted feature indices stored in the personal media database 226 may contain many redundant or non-related texts. Redundant text features decrease performance searches on the database 226. Additionally, providing such redundant or non-related text in a search result may confuse a user. Hence the database 226 text features are refined either by deleting non-relevant features or by decreasing their importance or relevance weights. These aims are accomplished in view of the user action log 228.

Each record in the user log 228 includes a user inserted text portion (e.g., user typed, spoken, or otherwise inserted), and an attached media object. In light of this, all text portions of the user log records 228 that contain the same media objects are combined together. Keyword frequencies across this combined text are calculated. These keyword frequency calculations replace the keyword weights in the original semantic features that correspond to the same media object.

Moreover, a number of top frequency keywords (e.g., the three (3) top frequency keywords) are selected along with their respective locations relative to the media object in the original document layout. Other media objects that came from similar sources (e.g., the same web page, the same website, and e-mail from the same person) are then examined. If a keyword in the semantic features of the other evaluated media came from the same relative locations of those top frequency keywords, there is confidence that the keyword's weight should be increased some amount (e.g., 10%). In this way, portions of original document layout that are more relevant to the semantics of the media object are determined.

An Exemplary Media Agent Process and Data Flow

Figure 3:
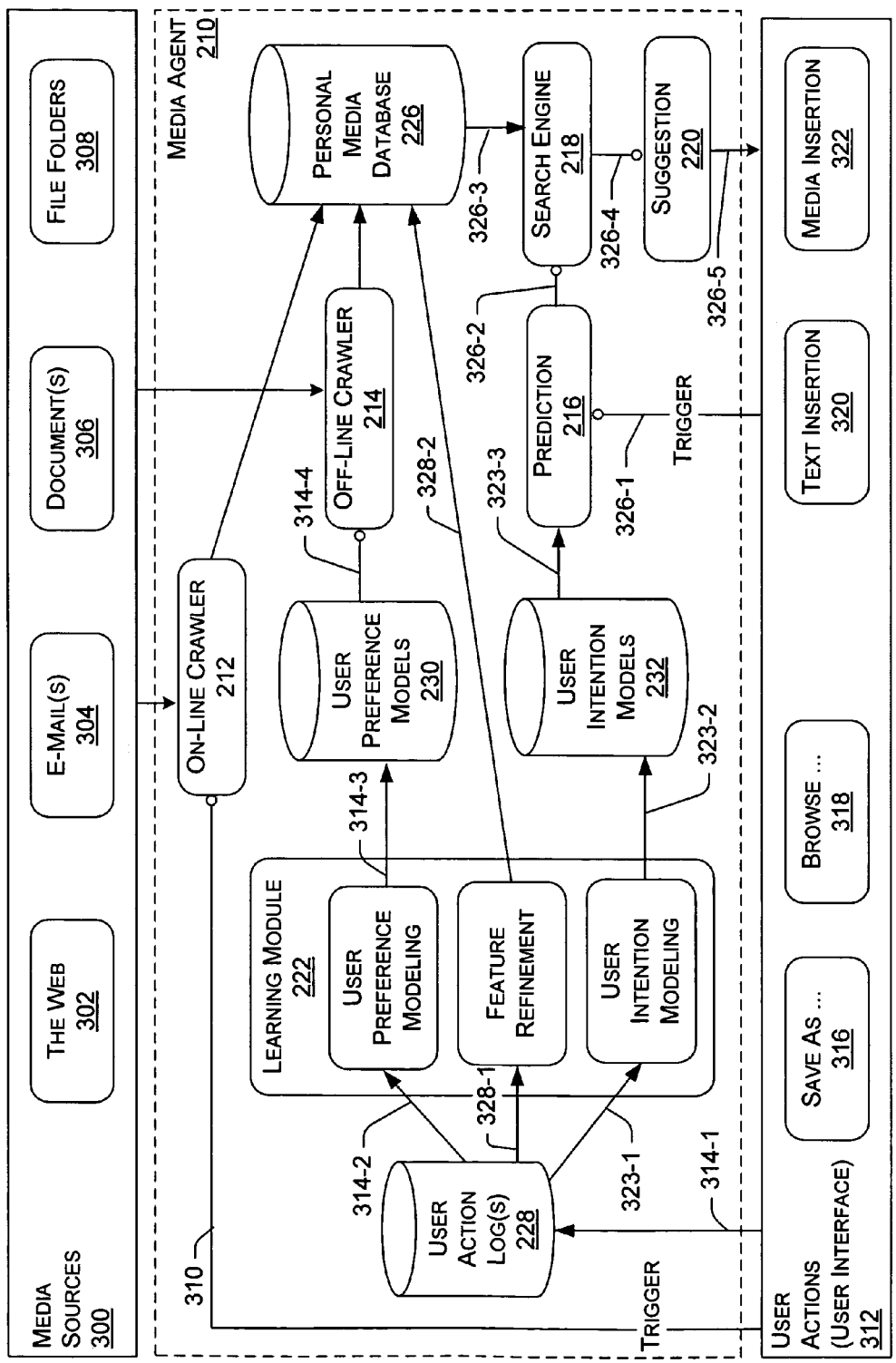
FIG. 3 shows exemplary aspects of process and data flows between modules and data sinks in the media agent module. Specifically.

FIG. 3 shows exemplary aspects of process and data flows between modules and data sinks in the media agent module 210. Specifically, FIG. 3 shows sequences in which data transfer, use, and transformation are performed during the execution of the media agent 210 of FIG. 2. Data flow is illustrated with lines between respective modules and data sinks. Actions or events that trigger or cause execution and subsequent data flow are shown with lines capped with circles rather than arrows.

Sources of media content 300 include, for example, the WWW or the Web 302, e-mail messages 304, local and remote documents or Web pages 306, local and remote file folders 308, and so on. These media content sources 300 are only a few examples of the many possible sources of the media content pieces 106 of FIG. 1. On-line and offline crawler modules 212 and 214 retrieve semantic text description from these media content sources 300 to subsequently store into the personal media database 226. Trigger 310 shows that the on-line crawler is activated by user actions 312 such as accessing the Web 302, e-mails 304, documents or Web pages 306, file folders 308, user "save-as" actions 316, browsing 318, text insertion 320, media insertion 321, and so on.

The offline crawler 214 is activated to access any number of these media sources 300 at system idle or as otherwise indicated by a user. The particular media sources 300 that are to be accessed by the offline crawler 214 are determined by information stored in the user preference models 230. As discussed above, the learning module 222 and more specifically, the user preferences modeling sub-module generates the user preference models 230 from records of user actions stored in the user actions log 228. These data flows from the user action 312, to the user action log 228, to the learning module 222, the user preference models 230, and the offline crawler module 214 are shown by lines 314-1 through 314-4. Note that the dataflow 314-4 is a trigger. This means that a user can implicitly or explicitly express a preference for when and where the offline crawler 214 is to obtain its information.

The user intention model 232 stores information that is used by the prediction module 216 to predict or anticipate user intention. As discussed above, the user intention model data store 232 is generated by learning module 222 and more specifically by user intention modeling sub-module based on lexics, syntax, and/or patterns evaluated in training data such as data obtained from user action log 228. The user action log 228 stores records of the user's actions. Each record includes a text portion and an indication of whether or not a media file is part of the action. Direct associations between the user actions, corresponding media content, and user intentions are determined on lexical, syntactical, and/or pattern basis. These direct associations are stored in the user intention model 232 data store. Arrows 314-1, 323-1, and 323-2 represent the data flow from the user action 312 to the user intention model data store 232.

Certain user actions 312 cause media agent 210 modules to predict or anticipate user actions to provide semantically related suggestions to the user. Examples of such user actions 312 include, a "save as . . . " action 316, a "browse . . . " action 318, the insertion of text 320, and an insert item action 322. This action based trigger is illustrated by line 326-1. Responsive to such user actions, prediction module 216 evaluates direct associations between the user actions, corresponding media content, and user intentions. (These direct associations are stored in the user intention model data store 232 as shown by dataflow line 323-3). The prediction module 216 anticipates that the user desires to work with media files based on the user action 312 (e.g., the text information typed by the user, the selection of an insert media content menu item, and so on).

If the prediction module 216 determines that the user desires to work with media files, the prediction module 216 generates a potential search query vector (e.g., the query vector 234 of FIG. 2) from relevant information derived from evaluation of the user action 312 in view of the information in the user intention model 232. This query vector may have been partially or wholly formulated from text typed in by the user for any number of reasons, including in response to an explicit user search for information. The prediction module 216 triggers and communicates the predicted query vector to the search engine 218. This particular data flow is represented by arrows 326-2, through 326-3. Note that line 326-1 shows that user action 312 triggered the prediction module 216. Note also that line 326-2 shows that the prediction module 216 triggered the search engine 218.

The search engine 218 receives a search query vector (e.g., the query vector 234 of FIG. 2) that may have been wholly or partially generated from information (e.g., text) input by the user or wholly or partially generated by the prediction module 216. The search engine 218 evaluates this query in view of the semantic media content text indices stored in the personal media database 226. (Recall that these indices are created by the online and offline crawlers 212 and 214. These indices are also created by the feature refinement sub-module of the learning module 222 as described below).

If a relevant set of media objects in the personal media database 226 are identified, the search engine 218 triggers and communicates the identified media objects to the suggestion module 220. This information may be sorted and communicated to the suggestion module 220 according to each items semantic similarity to the search query. These data flow are represented by lines 326-1 through 326-4. Note that lines 326-1, 326-2, and 326-4 are triggers.

The suggestion module 220 receives a list of relevant media content from the search engine 218. This information is displayed to a user for viewing and response (e.g., selection or editing of a suggestion, editing of the semantic text corresponding to the suggestion, cancellation of the task, and so on). These data flow are represented by lines 326-4 through 326-5. Note that line 326-4 is a trigger.

The learning module 222 and specifically the feature refinement sub-module, refines the semantic media content text indices stored in the personal media database 226. To accomplish this, the feature refinement sub-module evaluates text and corresponding media content in the user action log 228 to evaluate corresponding keyword frequencies or keyword relevance. The feature refinement sub-module uses this keyword evaluation to redefine keyword weights in the personal media database 226 to correlate with a compiled history of user actions. This redefinition of keyword weights may result in removal of certain 226 keywords in indices in the database that are determined to be semantically non-related at that point in time. These data flow are represented by lines 328-1 and 328-2.

An Exemplary Media Agent Procedure

Figure 4:
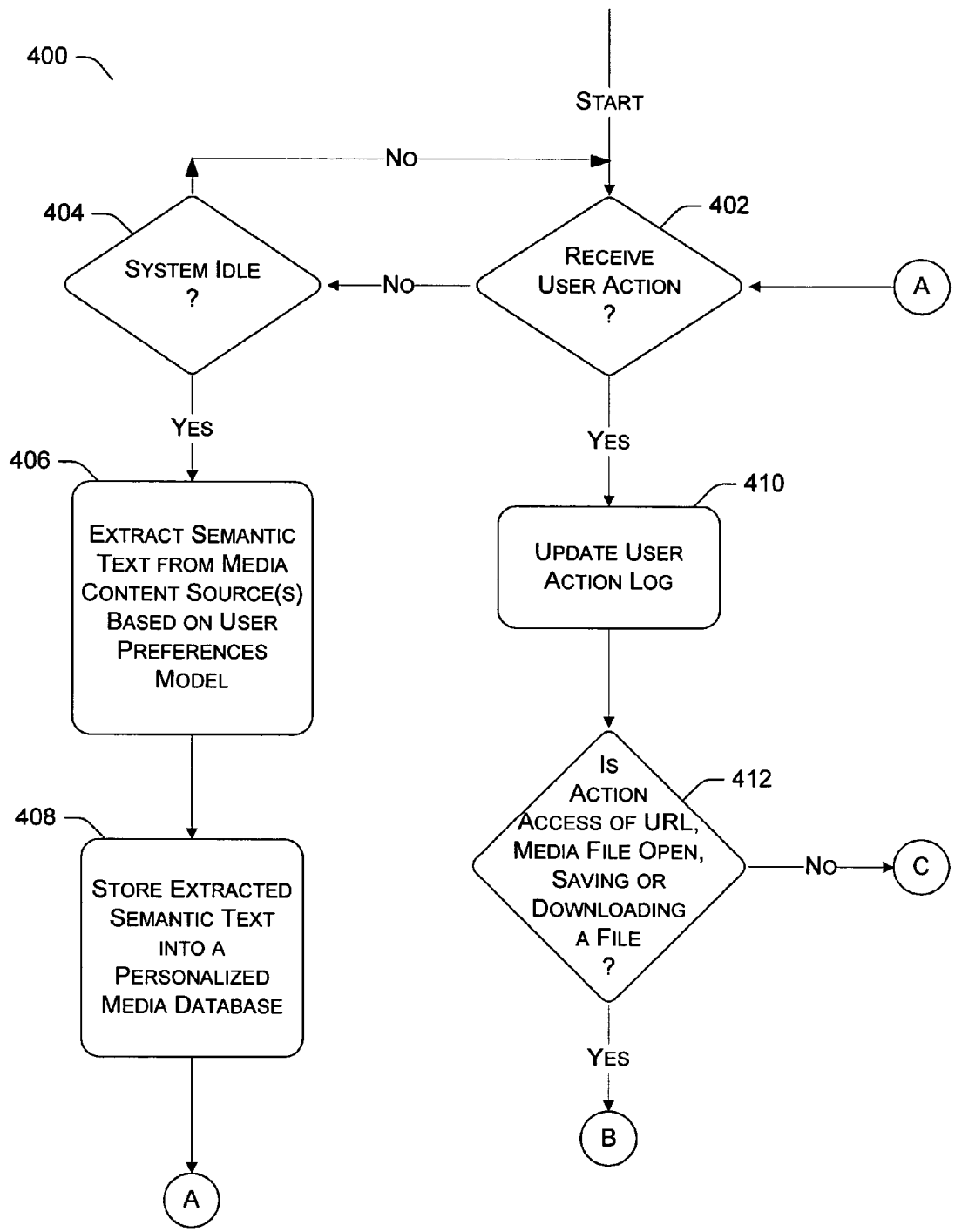
FIG. 4 shows an exemplary procedure to automatically collect, manage, and suggest information corresponding to personalized use of media content. More specifically.

FIG. 4 shows an exemplary procedure 400 to automatically collect, manage, and suggest information corresponding to personalized use of media content. More specifically, FIG. 4 shows a procedure 400 for a media agent 210 of FIGS. 2 and 3 to determine whether offline gathering of media content semantics, online gathering of media content semantics, preference and intention modeling, or user intention prediction and suggestion procedures should be performed.

At block 402, the procedure determines if a user action (e.g., a mouse move, a key press, saving of a file, downloading a file, following a link or hyperlink on a network, and so on) is received. If not, the procedure continues at block 404, wherein it is determined if the system 102 of the media agent 210 is idle for some reason (e.g., a pause between keystrokes, etc.). A system is in an idle state when it is operational and in service but one or more processing cycles is still available for use. Having determined that the system is not in an idle state, the procedure continues at block 402, as described above.

If the system is idle (block 404), the procedure 400 continues at block 406, wherein the offline crawler program module 214 extracts semantic text features from media content sources (e.g., e-mails, documents, memory caches, etc.), if any, according to the user preference model 230. The user preference model 230 indicates learned aspects of a user's behavior with respect to media content locations, preferred or frequently accessed media content, and so on. These learned aspects identify preferred media content and respective semantic features to extract and store while the system is idle.

At block 408, the procedure stores any extracted semantic features and corresponding media content (block 404) into the user's personalized media database 226. In this manner the database 226 includes personalized semantic indices (PSI) that reflect all of the media content accessed by the user. Since each user may have different preferences of his/her favorite media objects, the personal index may differ from user to user. The procedure continues at block 402.

At block 402, responsive to receiving a user action, the procedure continues at block 410, wherein a user action log (i.e., log 228 of FIGS. 2 and 3) is updated to include a record of the text and/or media content corresponding to the user's action (block 402). At block 412, it is determined if the action corresponds to user access of a URL, opening of a media file, or downloading a file (e.g., saving a file). If so, the procedure continues at on-page reference "B", as shown in FIG. 5.

Figure 5:
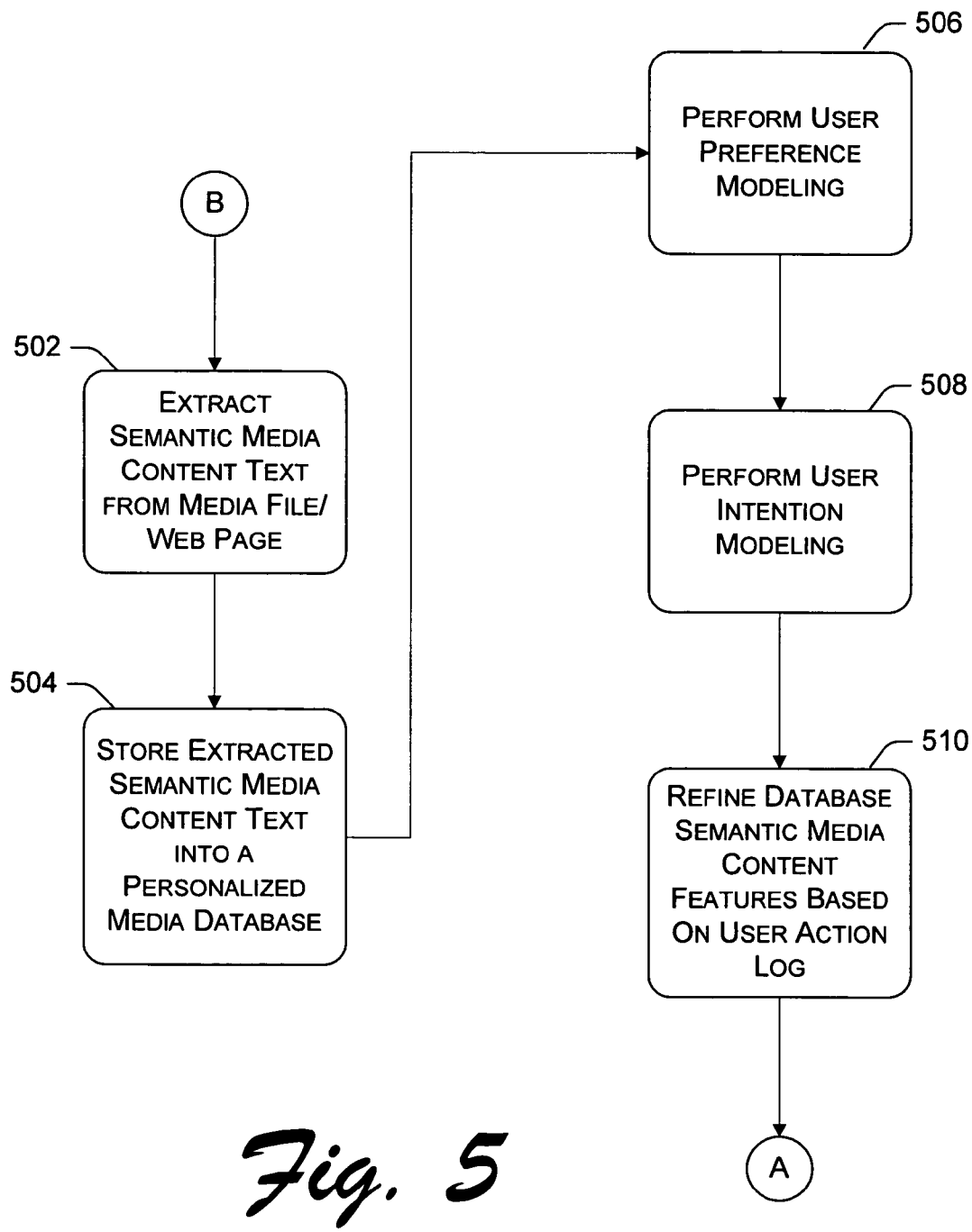
FIG. 5 shows further aspects of an exemplary procedure to automatically collect, manage, and suggest information corresponding to personalized use of media content. More specifically.

FIG. 5 shows further aspects of an exemplary procedure 400 to automatically collect, manage, and suggest information corresponding to personalized use of media content. More specifically, FIG. 5 shows further aspects of a procedure for a media agent 210 of FIGS. 2 and 3 to perform online gathering of media content semantics and preference and intention modeling. Reference "B" indicates that procedure 400 executes blocks 502 through 510. Although the blocks are orderly numbered, the ordering does not imply any preferred sequence of execution. For instance, blocks 502 and 504 may be executed before blocks 506 through 510, vice versa, and so on.

At block 502, the procedure 400 (i.e., the online crawler 212 of FIGS. 2 and 3) extracts semantic media content features (i.e., text features) from the media content itself and/or from a document (e.g., e-mail, Web page, etc.) corresponding to the media content. Recall that this operation (block 502) is performed responsive to a user action (e.g., a URL access, an open file action, a save as action, and so on). At block 504, the extracted semantic features and corresponding media content are stored in the user's personal media database 226. It can be appreciated that the semantic features can be stored separately, if desired, from the media content.

At block 506, user preference modeling is performed. As discussed above, the learning module 222 of FIGS. 2 and 3 and more specifically, the user preferences modeling sub-module (see, FIG. 3) generates the user preference models 230 from records of user actions stored in the user actions log 228.

At block 508, the procedure 400 performs user intention modeling to store information that is used by the prediction module 216 of FIGS. 2 and 3 to predict or anticipate user intention. As discussed above, the user intention model data store 232 is generated by learning module 222 and more specifically by user intention modeling sub-module of FIG. 3 based on lexics, syntax, and/or patterns evaluated in training data such as data obtained from user action log 228.

At block 510, the procedure 400 refines the semantic features corresponding to media content stored in the personal media database 226 of FIGS. 2 and 3. The feature refinement sub-module of FIG. 3 performs this operation by evaluating text features and corresponding media content in the user action log 228 to evaluate corresponding keyword frequencies or keyword relevance. The feature refinement sub-module uses this keyword evaluation to redefine or update keyword weights in the personal media database 226 to correlate or with a compiled history of user actions. At this point, the procedure 400 continues at block 402, as shown by the on-page reference "A" of FIG. 4.

Recall that at block 412 of FIG. 4, the procedure 400 determines if the identified user action (block 402) is of a particular type of user action (e.g., URL access, media file open, media file save as, and so on). If so, the discussed procedures of FIG. 5 were performed. However, if the user action was not of the particular type, the procedure 400 continues at block 602 of FIG. 6, as illustrated by on-page reference "C".

Figure 6:
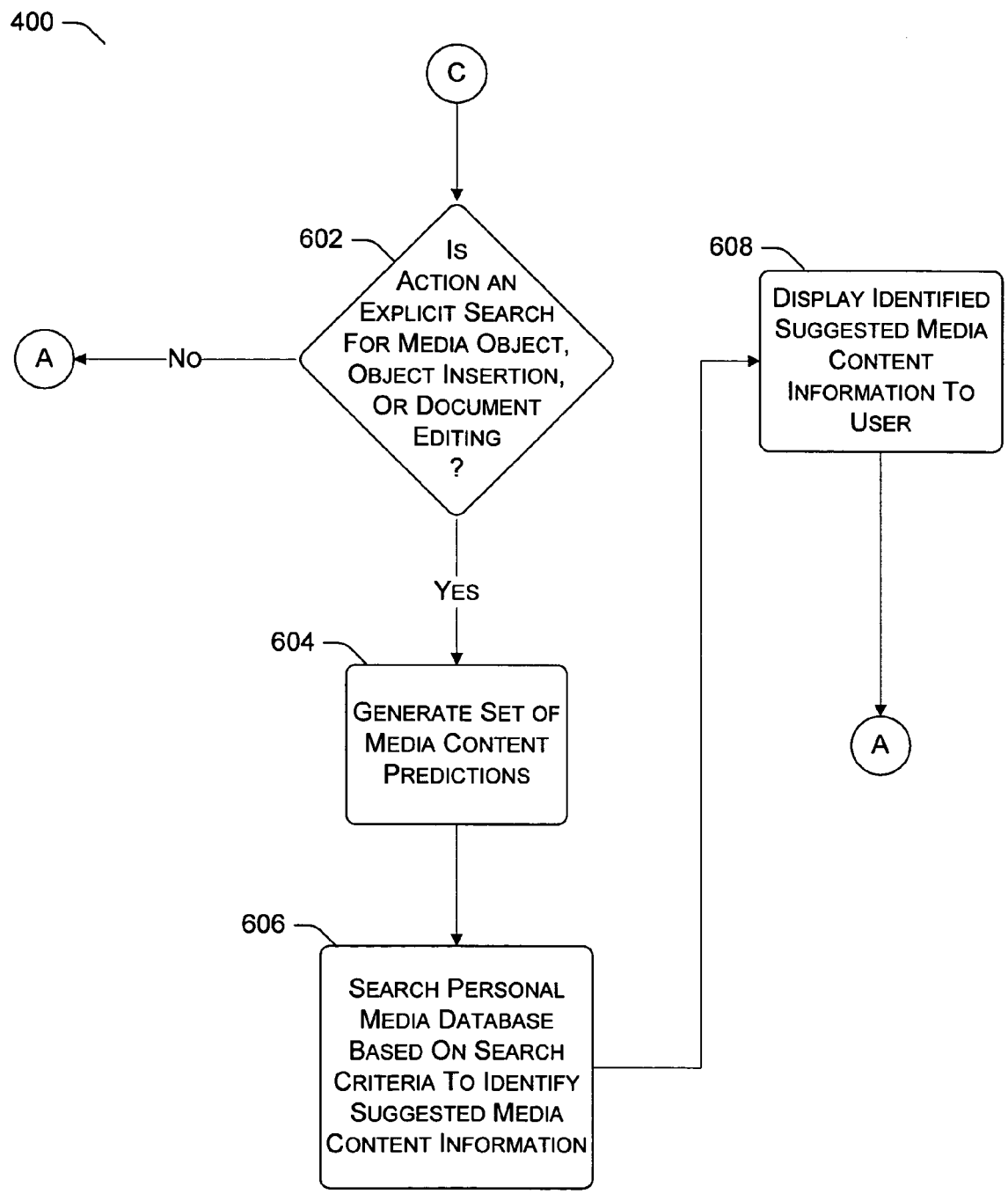
FIG. 6 shows further aspects of exemplary procedures to automatically collect, manage, and suggest information corresponding to personalized use of media content. More specifically.

FIG. 6 shows further aspects of exemplary procedures to automatically collect, manage, and suggest information corresponding to personalized use of media content. More specifically, FIG. 6 shows further aspects of a procedure for a media agent of FIGS. 2 and 3 to determine whether preference and intention modeling or user intention prediction and suggestion procedures should be performed. At block 602, the procedure 400 determines if the user action (block 402) is an explicit user search for a media object, an object insertion action, or action corresponding to a document edit (e.g., e-mail, a word-processing document, etc.). If not, the procedure continues at block 402, as indicated by the on-page reference "A" of page 4.

Otherwise, at block 604, the procedure (i.e., the prediction module 216 of FIGS. 2 and 3) generates a set of media content predictions using a user intention model 232 of FIGS. 2 and 3. A search query vector (e.g., the query vector 234 of FIG. 2) is generated from the media content predictions in view of the user action (block 602). At block 606, the procedure 400 uses the generated query vector (block 604) to search the user's personal media database 226 of FIGS. 2 and 3 for corresponding media content. At block 608, identified media content information (e.g., file names, URLs, etc . . . ) is displayed or "suggested" to the user for subsequent evaluation, selection, and/or other response (e.g., editing). The procedure continues at block 402, as indicated by the on-page reference "A" of page 4.

An Exemplary Suitable Computing Environment

Figure 7:
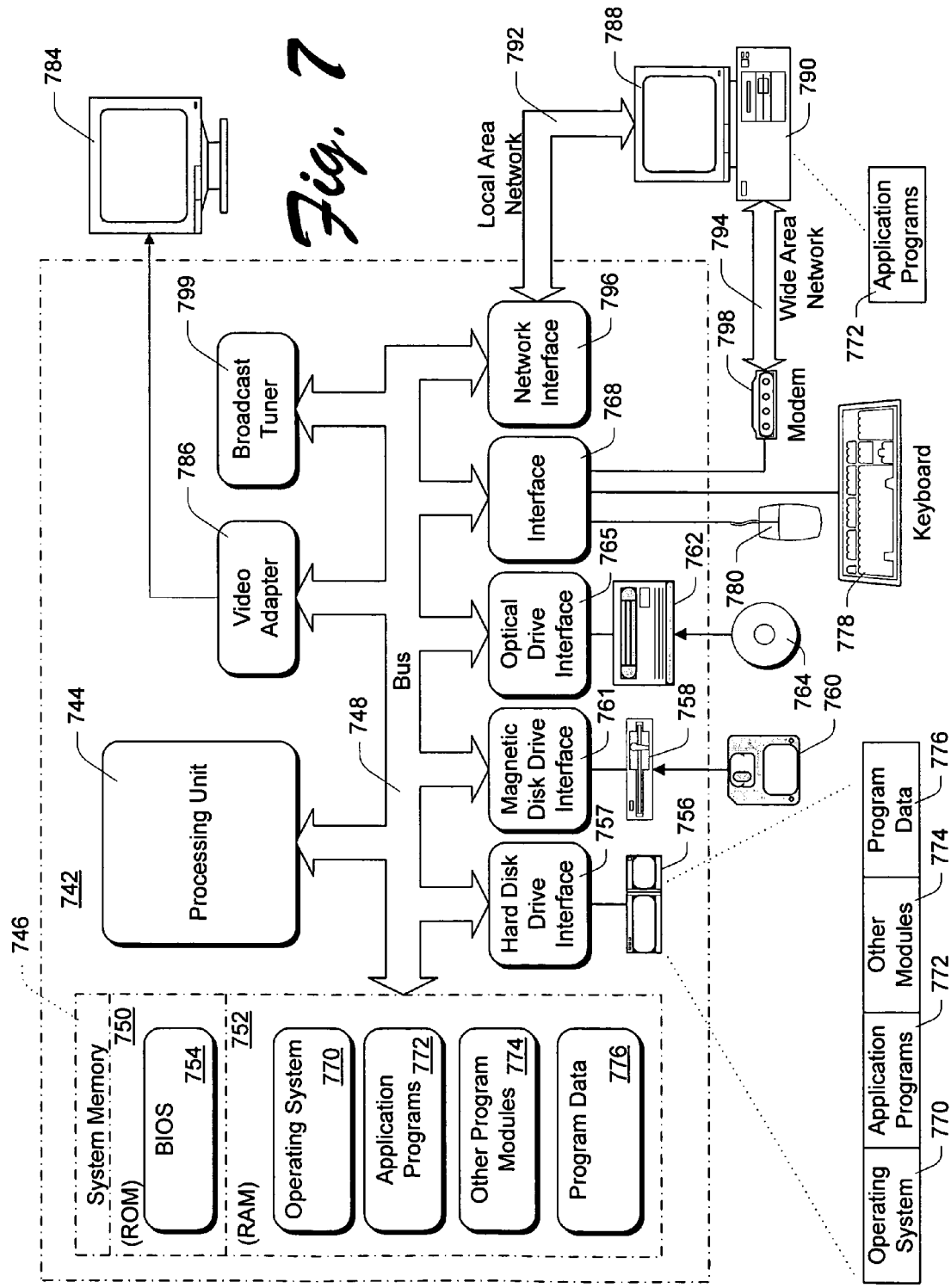
FIG. 7 illustrates aspects of an exemplary suitable operating environment in which a media agent to semantically index, suggest, and retrieve media content according to personal usage patterns may be implemented.

FIG. 7 illustrates aspects of an exemplary suitable operating environment in which a media agent to semantically index, suggest, and retrieve media content information according to personal usage patterns may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

FIG. 7 shows a general example of a computer 742 that can be used in accordance with the described arrangements and procedures. Computer 742 is shown as an example of a computer in which various embodiments of the invention can be practiced, and can be used to implement, for example, a client 102 of FIG. 1, a media agent 210, online and offline crawler components 212 and 214, prediction component 216, search engine component 218, suggestion component 220, or a learning component 222 of FIGS. 2 and 3, and so on. Computer 742 includes one or more processors or processing units 744, a system memory 746, and a bus 748 that couples various system components including the system memory 746 to processors 744.

The bus 748 represents one or more of any of several types of bus structures, including a memory bus or memory controller, a peripheral bus, an accelerated graphics port, and a processor or local bus using any of a variety of bus architectures. The system memory 746 includes read only memory (ROM) 750 and random access memory (RAM) 752. A basic input/output system (BIOS) 754, containing the basic routines that help to transfer information between elements within computer 742, such as during start-up, is stored in ROM 750. Computer 742 further includes a hard disk drive 756 for reading from and writing to a hard disk, not shown, connected to bus 748 via a hard disk drive interface 757 (e.g., a SCSI, ATA, or other type of interface); a magnetic disk drive 758 for reading from and writing to a removable magnetic disk 760, connected to bus 748 via a magnetic disk drive interface 761; and an optical disk drive 762 for reading from and/or writing to a removable optical disk 764 such as a CD ROM, DVD, or other optical media, connected to bus 748 via an optical drive interface 765. The drives and their associated computer-readable media provide nonvolatile storage of computer readable instructions, data structures, program modules and other data for computer 742. Although the exemplary environment described herein employs a hard disk, a removable magnetic disk 760 and a removable optical disk 764, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 760, optical disk 764, ROM 750, or RAM 752, including an operating system 770, one or more application programs 772, other program modules 774, and program data 776. A user may enter commands and information into computer 742 through input devices such as keyboard 778 and pointing device 780. Other input devices (not shown) may include a microphone, joystick, game pad, satellite dish, scanner, or the like. These and other input devices are connected to the processing unit 744 through an interface 768 that is coupled to the system bus (e.g., a serial port interface, a parallel port interface, a universal serial bus (USB) interface, etc.). A monitor 784 or other type of display device is also connected to the system bus 748 via an interface, such as a video adapter 786. In addition to the monitor, personal computers typically include other peripheral output devices (not shown) such as speakers and printers.

Computer 742 operates in a networked environment using logical connections to one or more remote computers, such as a remote computer 788. The remote computer 788 may be another personal computer, a server, a router, a network PC, a peer device or other common network node, and typically includes many or all of the elements described above relative to computer 742, although only a memory storage device 790 has been illustrated in FIG. 7. The logical connections depicted in FIG. 7 include a local area network (LAN) 792 and a wide area network (WAN) 794. Such networking environments are commonplace in offices, enterprise-wide computer networks, intranets, and the Internet. In certain embodiments of the invention, computer 742 executes an Internet Web browser program (which may optionally be integrated into the operating system 770) such as the "Internet Explorer" Web browser manufactured and distributed by Microsoft Corporation of Redmond, Wash.

When used in a LAN networking environment, computer 742 is connected to the local network 792 through a network interface or adapter 796. When used in a WAN networking environment, computer 742 typically includes a modem 798 or other means for establishing communications over the wide area network 794, such as the Internet. The modem 798, which may be internal or external, is connected to the system bus 748 via a serial port interface 768. In a networked environment, program modules depicted relative to the personal computer 742, or portions thereof, may be stored in the remote memory storage device. It will be appreciated that the network connections shown are exemplary and other means of establishing a communications link between the computers may be used.

Computer 742 also includes a broadcast tuner 799. Broadcast tuner 799 receives broadcast signals either directly (e.g., analog or digital cable transmissions fed directly into tuner 799) or via a reception device (e.g., via antenna or satellite dish).

Computer 742 typically includes at least some form of computer readable media. Computer readable media can be any available media that can be accessed by computer 742. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer storage medium includes, but is not limited to, RAM, ROM, EEPROM, flash memory or other memory, CD-ROM, digital versatile disks (DVD), magnetic cassettes, magnetic tape, magnetic disk storage or other magnetic storage devices or any storage mediums which can be used to store the desired information and which can be accessed by computer 742. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the described arrangements and procedures defined in the appended claims are not limited to the specific features or acts described. Rather, the specific features and acts are disclosed as exemplary forms of implementing the described arrangements and procedures.

The invention claimed is:

1. A computer-implemented method for indexing a database, the method comprising:
   detecting user access of media content source by using a computer, the media content source is stored in a computer readable storage medium;
   determining media content use preferences based on user actions, wherein the media content use preferences comprise a plurality of user preference models, each user preference model comprising semantically similar keywords that correspond to the user actions, wherein the media content use preferences are further based on keywords extracted from information corresponding to the user actions;

automatically collecting, from the media content source, media content referenced by a uniform resource locator (URL) and the URL, wherein the detecting, the determining and the collecting are performed responsive to detecting an idle state;

extracting semantic text features from, the media content and the URL, wherein the extracting the semantic text features is determined according to a set of extraction rules, wherein the set of extraction rules comprises at least one rule specifying surrounding text be within a threshold semantic distance from a piece of the media content;

determining that the media content is interest to a user based at least in part on semantic similarity between the media content use preferences and the semantic text features, and wherein the media content is determined to be interest to the user if there is semantic similarity between the media content and at least one of the user preference models;

responsive to determining that the media content is interest to the user, indexing a media database with the extracted semantic text features;

monitoring the user actions to identify patterns of media content use from the user actions;

modifying indication of relevancy with respect to ones of pieces of the media content based on the patterns of the media content use;

performing an analysis of a text to determine that the user desires to access the media content, wherein the analysis is based at least in part on patterns of previous media content use;

in response to performing the analysis, generating search criteria based on linguistic features of the text, identifying, based at least in part on the search criteria, one or more media files that are semantically related to the text from the media database; and presenting information corresponding to the one or more media files to the user.

2. The method as recited in claim 1, wherein the set of extraction rules comprise at least one rule specifying that the URL be parsed for words contained in a dictionary.

3. A computer-readable storage medium embodied computer-executable instructions that are executed by a computer for performing steps of:

determining media content use preferences based on user actions, wherein the media content use preferences comprise a plurality of user preference models, each user preference model comprising semantically similar keywords that correspond to the user actions;

detecting user access of a media content source;

in response the detecting the user access, automatically collecting, from the media content source, a piece of media content having a graphical presentation that includes surrounding text, and the surrounding text, wherein the determining, the detecting, and the collecting are performed responsive to detecting an idle state;

extracting semantic text features from, the surrounding text and the piece of media content, wherein the extracting the semantic text features is determined according to a set of extraction rules, wherein the set of extraction rules comprise at least one rule specifying the surrounding text be within a threshold graphical distance from the piece of media content, wherein at least a portion of the semantic text features include an indication of relevancy with respect to ones of the pieces of media content;

monitoring the user actions to identify patterns of media content use from the user actions;

for each semantic text feature in the at least a portion, modifying the indication of relevancy with respect to ones of the pieces of media content based on the patterns of the media content use, determining that the media content is interest to a user based at least in part on semantic similarity between the media content use preferences and the semantic text features, and wherein media content is determined to be interest to the user if there is semantic similarity between the media content and at least one of the user preference models;

responsive to determining that the media content is interest to the user, indexing a media database with the extracted semantic text features;

performing an analysis of a text to determine that the user desires to access the media content;

in response to performing the analysis, generating search criteria based on linguistic features of the text, identifying, based at least in part on the search criteria, one or more media files that are semantically related to the text from the media database; and presenting information corresponding to the one or more media files to the user.

4. The computer-readable storage medium as recited in claim 3, wherein the media content source is an e-mail message, wherein the media content is an attachment to the e-mail message or a link, and wherein the text is a body of the e-mail message.

5. The computer-readable storage medium as recited in claim 3, wherein a media content source comprises a word processing document, wherein the media content is inserted media content, and wherein the text is document text.

6. A computing device for indexing a database, comprising:

a processor;

a memory coupled to the processor, the memory comprising computer-executable instructions, the computer-executable instructions are executed by the processor for performing steps of:

detecting user access of media content source by using a computer;

determining media content use preferences based on user actions, wherein the media content use preferences comprise a plurality of user preference models, each user preference model comprising semantically similar keywords that correspond to the user actions, wherein the media content use preferences are further based on keywords extracted from information corresponding to the user actions;

automatically collecting, from the media content source, media content referenced by a uniform resource locator (URL) and the URL, wherein the detecting, the determining and the collecting are performed responsive to detecting an idle state;

extracting semantic text features from, the media content and the URL, wherein the extracting the semantic text features is determined according to a set of extraction rules, wherein the set of extraction rules comprises at least one rule specifying surrounding text be within a threshold semantic distance from a piece of the media content;

determining that the media content is interest to a user based at least in part on semantic similarity between the media content use preferences and the semantic text features, and wherein the media content is determined to be interest to the user if there is semantic similarity between the media content and at least one of the user preference models;

responsive to determining that the media content is interest to the user, indexing a media database with the extracted semantic text features;

monitoring the user actions to identify patterns of media content use from the user actions;

modifying indication of relevancy with respect to ones of pieces of the media content based on the patterns of the media content use;

performing an analysis of a text to determine that the user desires to access the media content, wherein the analysis is based at least in part on patterns of previous media content use;

in response to performing the analysis, generating search criteria based on linguistic features of the text, identifying, based at least in part on the search criteria, one or more media files that are semantically related to the text from the media database; and presenting information corresponding to the one or more media files to the user.

7. A computing device for indexing a database, comprising:

a processor;

a memory coupled to the processor, the memory comprising computer-executable instructions, the computer-executable instructions are executed by the processor for performing steps of:

determining media content use preferences based on user actions, wherein the media content use preferences comprise a plurality of user preference models, each user preference model comprising semantically similar keywords that correspond to the user actions;

detecting user access of a media content source;

in response the detecting the user access, automatically collecting, from the media content source, a piece of media content having a graphical presentation that includes surrounding text, and the surrounding text, wherein the determining, the detecting, and the collecting are performed responsive to detecting an idle state;

extracting semantic text features from, the surrounding text and the piece of media content, wherein the extracting the semantic text features is determined according to a set of extraction rules, wherein the set of extraction rules comprise at least one rule specifying the surrounding text be within a threshold graphical distance from the piece of media content, wherein at least a portion of the semantic text features include an indication of relevancy with respect to ones of the pieces of media content;

monitoring the user actions to identify patterns of media content use from the user actions;

for each semantic text feature in the at least a portion, modifying the indication of relevancy with respect to ones of the pieces of media content based on the patterns of the media content use, determining that the media content is interest to a user based at least in part on semantic similarity between the media content use preferences and the semantic text features, and wherein media content is determined to be interest to the user if there is semantic similarity between the media content and at least one of the user preference models;

responsive to determining that the media content is interest to the user, indexing a media database with the extracted semantic text features;

performing an analysis of a text to determine that the user desires to access the media content;

in response to performing the analysis, generating search criteria based on linguistic features of the text, identifying, based at least in part on the search criteria, one or more media files that are semantically related to the text from the media database; and presenting information corresponding to the one or more media files to the user.

* * * * *